United States Patent [19]
Blasina et al.

[11] 3,878,192
[45] Apr. 15, 1975

[54] SWEET AND PALATABLE WATER SOLUBLE DERIVATIVES OF ERYTHROMYCIN

[75] Inventors: Pietro Blasina, Milan; Egidio Molinari, Erba, both of Italy

[73] Assignee: Blasina, Lab. Chim. Farm., Milan, Italy

[22] Filed: June 5, 1972

[21] Appl. No.: 259,471

[52] U.S. Cl. ............................. 260/210 E; 424/181
[51] Int. Cl. .......................................... C07c 129/18
[58] Field of Search ................................ 260/210 E

[56] References Cited
UNITED STATES PATENTS

| | | | |
|---|---|---|---|
| 2,857,312 | 10/1958 | Stephens | 260/210 E |
| 2,881,163 | 4/1959 | Walasek | 260/210 E |
| 2,993,833 | 7/1961 | Stephens | 260/210 E |
| 3,040,025 | 6/1962 | Murphy | 260/210 E |
| 3,531,460 | 9/1970 | Ferrari et al. | 260/210 E |

FOREIGN PATENTS OR APPLICATIONS

| | | | |
|---|---|---|---|
| 843,137 | 8/1960 | United Kingdom | 260/210 E |

*Primary Examiner*—Johnnie R. Brown
*Attorney, Agent, or Firm*—Hubbell, Cohen, and Stiefel

[57] ABSTRACT

Erythromycin and esters thereof are made palatable and water soluble by forming derivatives thereof with glycyrrhizic acid. Said derivatives are also salified with at least one base to improve the water solubility thereof.

11 Claims, No Drawings

SWEET AND PALATABLE WATER SOLUBLE DERIVATIVES OF ERYTHROMYCIN

The present invention relates to new sweet and palatable water soluble Erythromycin derivatives and to a process for their preparation.

More particularly, the present invention relates to new sweet and palatable water soluble derivatives of a compound selected from the group consisting of Erythromycin base and Erythromycin esters with Glycyrrhizic acid in the presence of a base. Glycyrrhizic acid, also called glycyrrhetinic acid glycoside, having the empirical formula $C_{42}H_{62}O_{16}$ may be recovered by extraction of the plant, Glycyrrhiza Glabra (Helv. Chim. Acta, 4, 100 (1921) and its structure was determined by Trippet, et al., J. Chem. Soc. 1950, page 1983.

Due to its bitter taste, Erythromycin possesses limited utility for oral administration and many efforts have been made in order to mask the bitter taste, for instance, by esterifying the hydroxyl group of the desosamine moiety with a suitable mono-or dicarboxylic pharmacologically acceptable organic acid; for example, see U.S. Pat. No. 2,862,921; British Pat. No. 830,846; U.S. Pat. No. 2,969,352 and U.S. Pat. No. 2,993,833.

Unfortunately, all the derivatives thereby obtained only partially meet the requirements for good palatability and water-solubility: in other words, they are either tasteless but practically water insoluble or slightly water soluble but still retaining an unpleasant taste.

It has now been surprisingly found, that Erythromycin and its esters may be transformed into water soluble derivatives in the presence of glycyrrhizic acid and of a base and that these derivatives are sweet and quite palatable.

An object of the present invention is to provide a method of preparing aqueous solutions of this antibiotic at a concentration which is far higher than all heretofore known Erythromycin derivatives.

In fact, it has been found that Erythromycin base salified with a molar equivalent of glycyrrhizic acid in the presence of a molar equivalent of a base, gives a water solution at a concentration of up to 25% weight/volume calculated on the Erythromycin base.

This behavior is not limited to Erythromycin base but extends to its esters: in fact, propionate, ethylsuccinate, ethylcarbonate esters give also water soluble salts with glycyrrhizic acid in the presence of an inorganic or an organic base.

As suitable inorganic or organic base, a large number of substances may be employed such as alkali metal hydroxides, carbonates, bicarbonates, and the like, ammonium hydroxide, lower aliphatic amines, alkanolamines, heterocyclic secondary amines in which the nitrogen atom is part of the heterocyclic ring and tertiary amines such as lidocaine, procaine and the like, and suitable mixtures thereof Another object of the present invention is the provision of injectable pharmaceutical preparations which, depending upon the organic base chosen, may be quite painless in intramuscular administration by means of a hypodermic needle and the like.

It must be noted that unless a base is used which adjustes the pH value of the Erythromycin glycyrrhizic acid salt most of the derivatives are rather water insoluble.

A water solution may be obtained having a pH between 4.5 and 9.

The molar ratio of Erythromycin (base or ester) : Glycyrrhizic acid may vary between 3:1 and 1:1 but in those cases in which the ratio is higher than 1, the solubility of the product is rather decreased even though the sweet taste is conserved.

The process of the present invention is based on the direct salification of Erythromycin base or its esters with glycyrrhizic acid.

The reaction is carried out at room temperature, but it may be performed at a temperature in the range from 0° to 50° C in a suitable solvent or in a solvent mixture in homogeneous or heterogeneous phase.

These solvents may be polar or non-polar and are selected from the group consisting of water, alcohols such as methanol, ethanol, pronanol, lower ketones such as acetone, methyl-ethyl-ketone, cyclic esters such as dioxane, lower alkyl halides such as methylene chloride, ethylene dichloride and chloroform, N-alkylformamides such as dimethylformamide and suitable mixture thereof.

The salification generally takes place in a homogeneous phase with both reactants remaining soluble.

After a slight heating followed by the addition of the desired base, the solvent is removed and the crystalline powder is collected and dried in "vacuo".

By using other solvents on adding the base, a precipitate may be recovered and collected by filtration.

The reaction may however also be performed in a heterogeneous phase. In this case, the end of the reaction is observed by the disappearing of the insoluble starting material.

In cases in which the solvent used is water, at the end of the reaction the solution may be directly filtered, freeze dried and lyophylized.

The following examples illustrate the invention however without limiting it.

EXAMPLE 1

7.34 g. of erythromycin base are dissolved in acetone. To this solution, 8.23 g. of glycyrrhizic acid are added. By heating at about 30° the solution is complete. The solvent is evaporated in "vacuo" and ethyl ether is added. A white powder is collected by filter ring and drying in vacuo

EXAMPLE 2

By operating as in example 1 and additionally of adding one molar equivalent of lidocaine, 15.65 g. of nearly white powder are recovered.

The product is water soluble and has a sweet taste.
pH (1% solution) 5.8, Activity 402 mcg/mg, Solubility, water appr. 50%

EXAMPLE 3

7.90 g. of Erythromycin Propionate are dissolved in 40 cc. of ethanol together with 8.23 g. of glycyrrhizic acid. One molar equivalent of sodium hydroxide is added. The solvent is removed in vacuo. There are obtained 16.1 g. of yellowish crystals.

Solubility, water 25%, Activity 435 mcg/mg, pH(solution of 1%) 5.5

EXAMPLE 4

8.06 g. of Erythromycin Ethylcarbonate are dissolved in 40 ml of acetone. A solution of 8.23 g. of glycyrrhizic acid in 20 ml of acetone is added followed by a molar equivalent of lidocaine.

The resulting precipitate is collected by filtration and dried in vacuo.

Solubilty, water 33%, Activity 385 mcg/mg, pH (1% solution) 5.4

EXAMPLE 5

17.24 g. of Erythromycin Ethylsuccinate are dissolved in acetone. 16.46 g. glycyrrhizic acid are added. After solution, the addition of a molar equivalent sodium hydroxide causes the precipitation of white crystals. The product is water soluble.

solubility, water 25%, Activity 418 mcg/mg, pH (1% solution) = 6.0

EXAMPLE 6

8.62 g. of Erythromycin Ethylsuccinate are dissolved in methanol, followed by 8.23 g. of glycyrrhizic acid and by 1.5 molar equivalent of monoethanolamine.

The solvent is removed in vacuo. The solid residue is pulped with petroleum ether and the product collected by filtration. The white crystals are sweet and water soluble.

solubility, water 50% Activity 408 mcg/mg, pH (1% solution) 6.6

What we claim is:

1. A water soluble derivative of an erythromycin antibiotic selected from the group consisting of erythromycin and esters thereof with a lower alkyl carboxylic acid, erythromycin ethylcarbonate, erythromycin ethyl succinate and glycyrrhizic acid.

2. A water soluble derivative of erythromycin and glycyrrhizic acid having the formula:

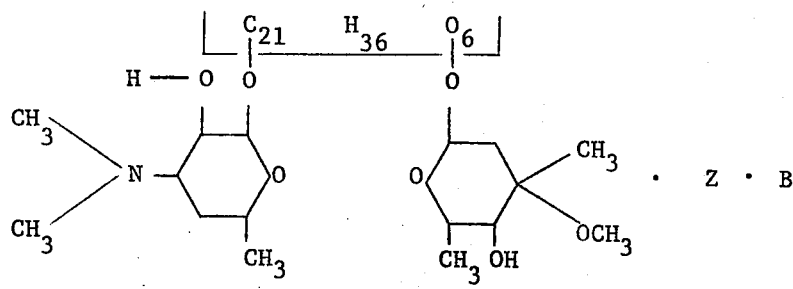

wherein Z represents from ⅓ to 1 mole of glycyrrhizic acid and B represents from 0 to 2 moles of at least one base selected from the group consisting of alkali metal hydroxides, carbonates, bicarbonates, ammonium hydroxide, lower alkanolamine, and tertiary amines selected from the group consisting of lidocaine and procaine.

3. A water soluble derivative of glycyrrhizic acid and erythromycin esters having the formula:

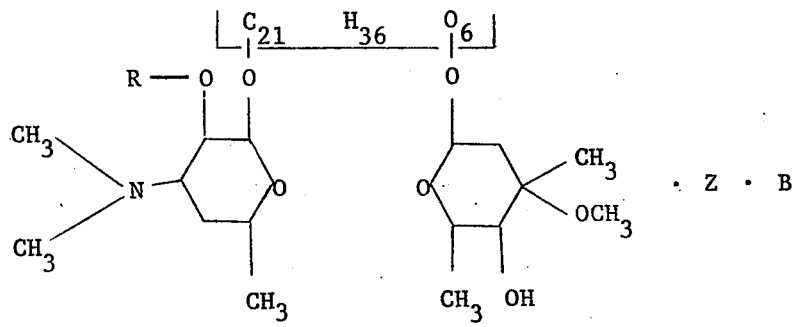

wherein R is a radical of a lower alkyl carboxylic acid, erythromycin ethylcarbonate or erythromycin ethylsuccinate, Z represents 1 mole of glycyryhizic acid and B represents from 0 to 2 moles of at least one base selected from the group consisting of alkali metal hydroxides, carbonates, bicarbonates, ammonium hydroxide, lower alkanolamine, and tertiary amines selected from the group consisting of lidocaine and procaine.

4. Erythromycin glycyrrhizic acid salts.

5. Erythromycin propionate glycyrrhizic acid salts.

6. Erythromycin ethylcarbonate glycyrrhizic acid salts.

7. Erythromycin ethylsuccinate glycyrrhizic acid salts.

8. A derivative as claimed in claim 1 which is a salt of at least one inorganic base selected from the group consisting of alkali metal hydroxides, carbonates, bicarbonates and ammonium hydroxide.

9. A derivative as claimed in claim 1 which is a salt of at least one organic base selected from the group consisting of lower alkanolamine, and tertiary amines selected from the group consisting of lidocaine and procaine.

10. A derivative as claimed in claim 9 wherein said organic base is lidocaine.

11. A derivative as claimed in claim 9 wherein said organic base is constituted by lidocaine and at least one of the other of said organic bases.

* * * * *

PO-1050
(5/69)

UNITED STATES PATENT OFFICE
CERTIFICATE OF CORRECTION

Patent No. 3,878,192        Dated April 15, 1975

Inventor(s) Pietro BLASINA and Egidio MOLINARI

It is certified that error appears in the above-identified patent and that said Letters Patent are hereby corrected as shown below:

Column 1, lines 65-66: "adjustes" should read -- adjusts --.

Column 1, line 67: "salt most" should read -- salt, most --.

Column 2, line 45: "filter ring" should read -- filtering --.

Column 2, line 46: "vacuo" should read -- vacuo. --.

Column 2, line 50: "additionally of" should read -- additionally --.

Column 3, line 25: "16.46 g. glycyrrhizic" should read -- 16.45 g. of glycyrrhizic --.

Column 4, line 20: "glycryyhizic" should read -- glycyrrhizic --.

Signed and Sealed this ninth Day of September 1975

[SEAL]

*Attest:*

RUTH C. MASON
*Attesting Officer*

C. MARSHALL DANN
*Commissioner of Patents and Trademarks*